United States Patent
Burke (10) Patent No.: US 11,391,832 B2
(45) Date of Patent: Jul. 19, 2022

(54) PHASE DOPPLER RADAR

(71) Applicant: Massachusetts Institute of Technology, Cambridge, MA (US)

(72) Inventor: David Burke, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 953 days.

(21) Appl. No.: 16/156,411

(22) Filed: Oct. 10, 2018

(65) Prior Publication Data
US 2022/0196823 A1    Jun. 23, 2022

(51) Int. Cl.
| | | |
|---|---|---|
| G01S 13/58 | (2006.01) | |
| G01S 13/53 | (2006.01) | |
| G01S 7/292 | (2006.01) | |
| G01S 7/41 | (2006.01) | |

(52) U.S. Cl.
CPC ............ G01S 13/582 (2013.01); G01S 7/292 (2013.01); G01S 7/414 (2013.01); G01S 13/53 (2013.01)

(58) Field of Classification Search
CPC ........ G01S 13/582; G01S 7/292; G01S 7/414; G01S 13/53
See application file for complete search history.

(56) References Cited

U.S. PATENT DOCUMENTS

| | | | | |
|---|---|---|---|---|
| 5,510,990 A | * | 4/1996 | Hibino ............ | B60W 30/18145 701/96 |
| 2011/0221628 A1 | * | 9/2011 | Kamo ..................... | G01S 7/295 342/123 |
| 2013/0002470 A1 | * | 1/2013 | Kambe ................. | G01S 13/931 342/55 |
| 2014/0062763 A1 | * | 3/2014 | Kishigami ............... | G01S 3/74 342/158 |
| 2016/0018219 A1 | * | 1/2016 | Sakamoto ............. | G01S 13/584 702/158 |

(Continued)

OTHER PUBLICATIONS

International Search Report and Written Opinion of PCT/US2018/055272 dated Jul. 11, 2019 entitled "Phase Doppler Radar".

(Continued)

*Primary Examiner* — Donald H B Braswell
(74) *Attorney, Agent, or Firm* — Hamilton, Brook, Smith & Reynolds, P.C.

(57) ABSTRACT

A phase Doppler radar system may comprise a pulse Doppler receiver/transmitter (R/T) subsystem coupled with a processing subsystem. The system may determine target velocity and target detection events by collecting pulses from the pulse Doppler R/T subsystem, determine an undifferentiated phase of each of the pulses, differentiate the pulses, and determine a differentiated phase of each of the pulses. The system may perform a linear fit of the differentiated phases of the pulses to produce a slope and an intercept. The system may determine a set of initial estimates of coefficients of a nonlinear fit equation. The system may perform iterations of a nonlinear least squares fit, beginning with the initial coefficient estimates, to produce a non-linear fit result. The system may determine a goodness-of-fit (GoF) statistic associated with the nonlinear fit result, and declare a detection event when the GoF is superior to a GoF statistic associated Gaussian noise.

23 Claims, 10 Drawing Sheets

(56) References Cited

U.S. PATENT DOCUMENTS

2016/0084943 A1\* 3/2016 Arage .................... G01S 13/42
342/102
2017/0192088 A1 7/2017 Fluhler

OTHER PUBLICATIONS

Kim, S., et al: "On the Development of a Multifunction Millimeter-Wave Sensor for Displacement Sensing and Low-Velocity Measurement", IEEE Transactions on Microwave Techniques, Plenum, USA, vol. 52, No. 11, Nov. 2004.

International Preliminary Report on Patentability of PCT/US2018/055272 dated Apr. 8, 2021 entitled "Phase Doppler Radar".

\* cited by examiner

PHASE DOPPLER RADAR

GOVERNMENT SUPPORT

This invention was made with government support under Contract No. FA8702-15-D-0001 awarded by the U.S. Air Force. The government has certain rights in the invention.

BACKGROUND

Conventional Doppler radars typically use Fourier transforms to estimate velocity. This technique, however, is limited in precision by Nyquist and sampling limits. For certain applications, the performance of conventional Fourier based Doppler radars may be deficient in at least the following aspects:
  Detection of low speed targets among static clutter.
  Target ranging capability.
  Tracking association (due to imprecise velocity measurements).
  Target recognition (due to presence of inter-pulse motion).
  Inability to accommodate variable inter-pulse period radar architectures.

SUMMARY

The embodiments of a phase Doppler radar system and method described herein exploit raw in-phase (I) and quadrature (Q) data, derived from a radar pulse returned from a target to measure the velocity of the target with high precision in a track-before-detect (TBD) architecture, using a variety of traditional radar waveforms (as opposed to specialized waveforms). The described embodiments may facilitate (i) detection of low speed targets among static clutter, (ii) improved target ranging capability through the exploitation of phase information, (iii) improved track association through the utilization of high precision velocity measurements, (iv) improved target recognition by correcting for inter-pulse motion, and (v) interaction with variable inter-pulse period radar architectures for electronic protection.

The described embodiments of a pulse Doppler radar differ from typical high-resolution Doppler techniques in that they do not require specialized hardware or large bandwidth, and can be deployed as a "sidecar" subsystem on any traditional pulse doppler radar, regardless of scale. The described embodiments are efficient, are suitable for use in real-time radar systems, and are robust to staggered radar pulse data collection that have non-uniform time spacing.

In one aspect, the invention may be a phase Doppler radar system, comprising a pulse Doppler receiver and transmitter (R/T) subsystem, a processor; and a memory with computer code instructions stored thereon. The memory may be operatively coupled to the processor such that, when executed by the processor, the computer code instructions cause the system to collect N consecutive pulses, generated by the pulse Doppler R/T subsystem in response to reflections received from a target, N being a positive integer. The computer code instructions may further cause the system to determine an undifferentiated phase of each of the N pulses, differentiate the N pulses with respect to time, determine a differentiated phase of each of the differentiated N pulses, and perform a linear fit of the differentiated phases of the differentiated N pulses to produce a slope and an intercept.

The computer code instructions may further cause the system to (i) determine a set of initial estimates of coefficients of a non-linear fit equation, the coefficients being (a) a mean of the undifferentiated phase determinations, (b) a mean of the differentiated phase determinations, (c) the slope, and (d) the intercept, and (ii) perform M iterations of a non-linear least squares fit, M being a positive integer, beginning with the determined set of initial estimates of coefficients, to produce a non-linear fit result.

The computer code instructions may further cause the system to (i) determine a first goodness-of-fit (GoF) residual parameter with respect to non-linear least squares fit, and a second GoF residual parameter with respect to the N consecutive pulses received from the pulse Doppler R/T subsystem (ii) determine that the non-linear fit result is a detection event when the first GoF residual parameter is less than the second GoF residual parameter.

The second GoF residual parameter may be based on residuals of a Gaussian distribution associated with a mean and a standard deviation that corresponds to the N consecutive pulses received from the pulse Doppler R/T subsystem.

The residuals of the Gaussian distribution may be generated by determining a difference between the mean corresponding to a measured baseband voltage of the N consecutive pulses received from the pulse Doppler R/T subsystem and the measured baseband voltage of each of the N consecutive pulses.

The non-linear fit equation may be given by $IQ = k_0 + k_1 e^{(ik_2 t + k_3)}$, where IQ represents a measured baseband voltage of the N consecutive pulses received from the pulse Doppler R/T subsystem, and $k_0$, $k_1$, $k_2$ and $k_3$ are the coefficients of the non-linear fit equation. In an embodiment, $k_0$ may represent a magnitude of static clutter associated with the target, $k_1$ may represent a radar cross section of the target, $k_2$ may characterize a velocity of the target, and $k_3$ may represent an arbitrary phase offset.

The non-linear least squares fit may be performed by a Taylor expansion around the initial estimates of the coefficients. In an embodiment, each iteration of the non-linear least squares fit may produce an updated version of the coefficients, which are used for a subsequent iteration of the non-linear least squares fit. In an embodiment, the number M of non-linear least squares fit iterations is five.

In an embodiment, a linear fit of the phase of the differentiated N pulses may be performed to determine an initial estimate of the slope and the intercept.

In another aspect, the invention may be a method of determining a velocity of a target object, comprising (i) collecting N consecutive pulses, generated by a pulse Doppler receiver and transmitter (R/T) subsystem in response to reflections received from a target, N being a positive integer, (ii) determining an undifferentiated phase of each of the N pulses, (iii) differentiating the N pulses with respect to time, (iv) determining a differentiated phase of each of the differentiated N pulses, and (v) performing a linear fit of the differentiated phases of the differentiated N pulses to produce a slope and an intercept.

The method may further comprise (i) determining a set of initial estimates of coefficients of a non-linear fit equation, the coefficients being (a) mean of the undifferentiated phase determinations, (b) mean of the differentiated phase determinations, (c) the slope, and (d) the intercept, and (ii) performing M iterations of a non-linear least squares fit, M being a positive integer, beginning with the determined set of initial estimates of coefficients, to produce a non-linear fit result.

The method may further comprise (i) determining a first goodness-of-fit (GoF) residual parameter with respect to non-linear least squares fit, and a second GoF residual parameter with respect to the N consecutive pulses received from the pulse Doppler R/T subsystem, and (ii) determining that the non-linear fit result is a detection event when the first GoF residual parameter is less than the second GoF residual parameter.

The method may further comprise basing the second GoF residual parameter on residuals of a Gaussian distribution associated with a mean and a standard deviation that corresponds to the N consecutive pulses received from the pulse Doppler R/T subsystem.

The method may further comprise generating the residuals of the Gaussian distribution by determining a difference between the mean corresponding to a measured baseband voltage of the N consecutive pulses received from the pulse Doppler R/T subsystem and the measured baseband voltage of each of the N consecutive pulses.

The method may further comprise performing the non-linear least squares fit by a Taylor expansion around the initial estimates of the coefficients.

In another aspect, the invention may be a non-transitory computer-readable medium with computer code instruction stored thereon, the computer code instructions, when executed by a processor, cause an apparatus to (i) collect N consecutive pulses, generated by a pulse Doppler R/T subsystem in response to reflections received from a target, N being a positive integer, (ii) determine an undifferentiated phase of each of the N pulses, (iii) differentiate the N pulses with respect to time, (iv) determine a differentiated phase of each of the differentiated N pulses, and (v) perform a linear fit of the differentiated phases of the differentiated N pulses to produce a slope and an intercept.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments of a pulse Doppler radar (also referred to as a super-resolution radar) are directed to determining target velocity by extracting baseband phase information from the complex Doppler signal (i.e., I and Q data) returned from several successive radar pulses, and evaluating the baseband phase information with linear and non-linear regression techniques. The improved target velocity, compared to conventional Fourier-based pulse Doppler radar processing systems, may be used to produce a more reliable target detection decision.

The phase Doppler radar, to which the described embodiments are directed, is based on a different (though mathematically equivalent) interpretation of the Doppler effect than conventional Pulse-Doppler radars. The Doppler effect is an apparent compression or expansion of wavelength for waves reflecting from a moving target. Because of the physical displacement caused by target motion, the total distance traveled by the wave is different in subsequent radar pulses. For linear motion, this term is proportional to velocity and the time spacing between observations. Because this is a linear time dependent term, it is traditionally interpreted as a frequency shift for the reflected wave. A more precise interpretation is that the source becomes physically closer for each successive radar pulse, so the phase of the incident wave at the surface of the target is shifted slightly. Mathematically, a radar wave reflected from a target can be represented by the following equation:

$$V=\psi \exp(ikx-i_\omega t),$$

where V is the voltage received by an antenna, $\psi$ is a complex number that includes target reflectivity, damping due to range and other propagation phenomenology. The term x in the above equation represents the total distance traveled by the wave to the target and back to the radar, i.e., x=2R, R being the distance between the radar and the target. For a target with a fixed, non-zero velocity, this gives rise to an apparent phase shift between successive pulses, which is the Doppler effect, i.e. x=2R=2(R+vΔt). Acceleration can also be accounted for by replacing this term with x=2R=2(R+vΔt+1/2aΔt$^2$), however the described embodiments focus on the velocity component, which dominates for small Δt and small a.

In traditional Fourier Doppler analysis, the Doppler term is usually grouped with the frequency term to create an apparent frequency shift, i.e., $$V=\psi \exp(2ikR-i(\omega-2kv)t)$$

$$=\psi \exp(2ikR-2\pi i(f_0-f_1)t),$$

where $f_1=2kv$.

For an analysis according to the described embodiments of a phase Doppler radar, the shift in position is not grouped with the frequency. Instead, it remains as a time dependent positional component, specifically:

$$V=\psi \exp(2ikR-2kv\Delta t-i_\omega t)$$

When the incoming signal is down-converted to a real and complex intermediate frequency signal (the in-phase and quadrature components I and Q) the RF center frequency ω is removed, leaving $$V=\psi \exp(2ikR-2kv\Delta t)$$

The presence of time-invariant (stationary) clutter adds a constant complex offset to this waveform leading to the final equation:

$$V = \psi + \psi \exp(2ikR - 2kv\Delta t) \quad (1)$$

Figure 1A:
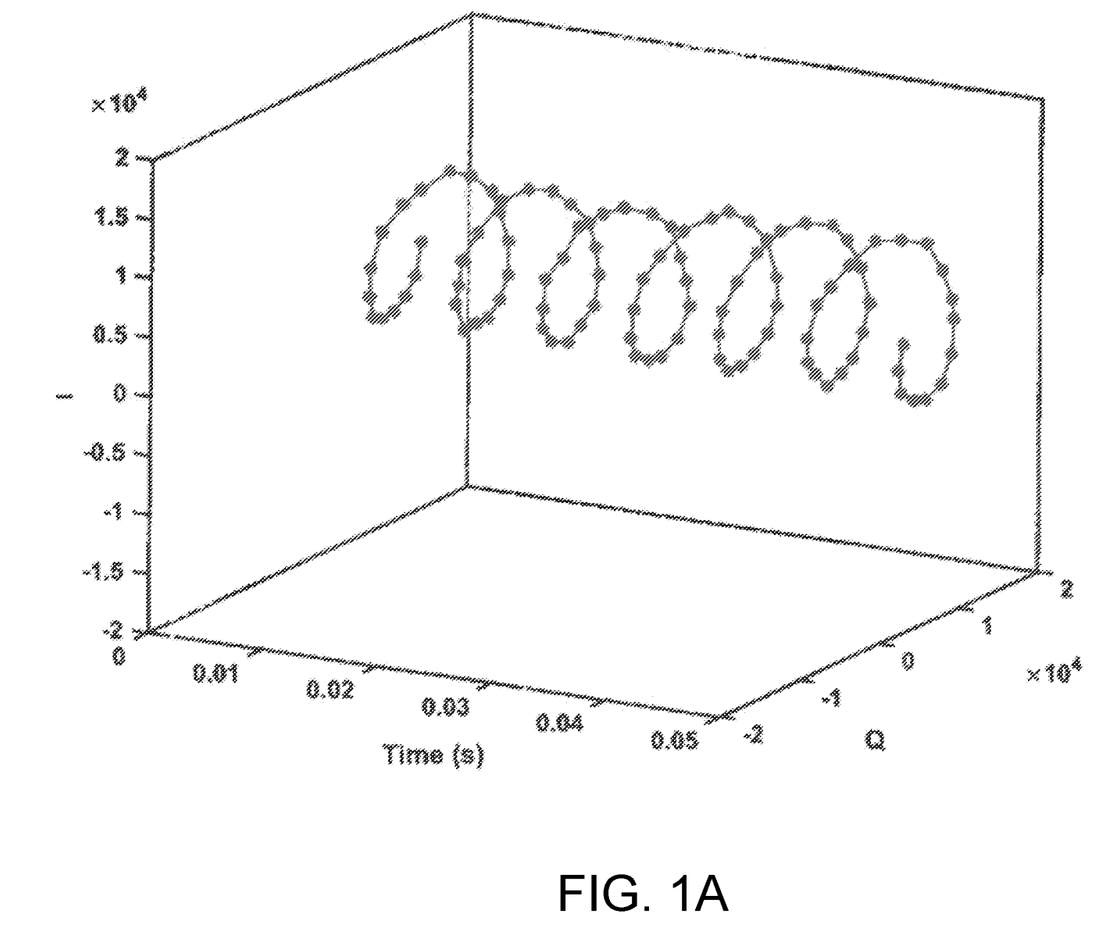
FIGS. 1A and 1B show a three-dimensional plot of the in-phase and quadrature (IQ) components of a radar return signal.
Figure 1B:
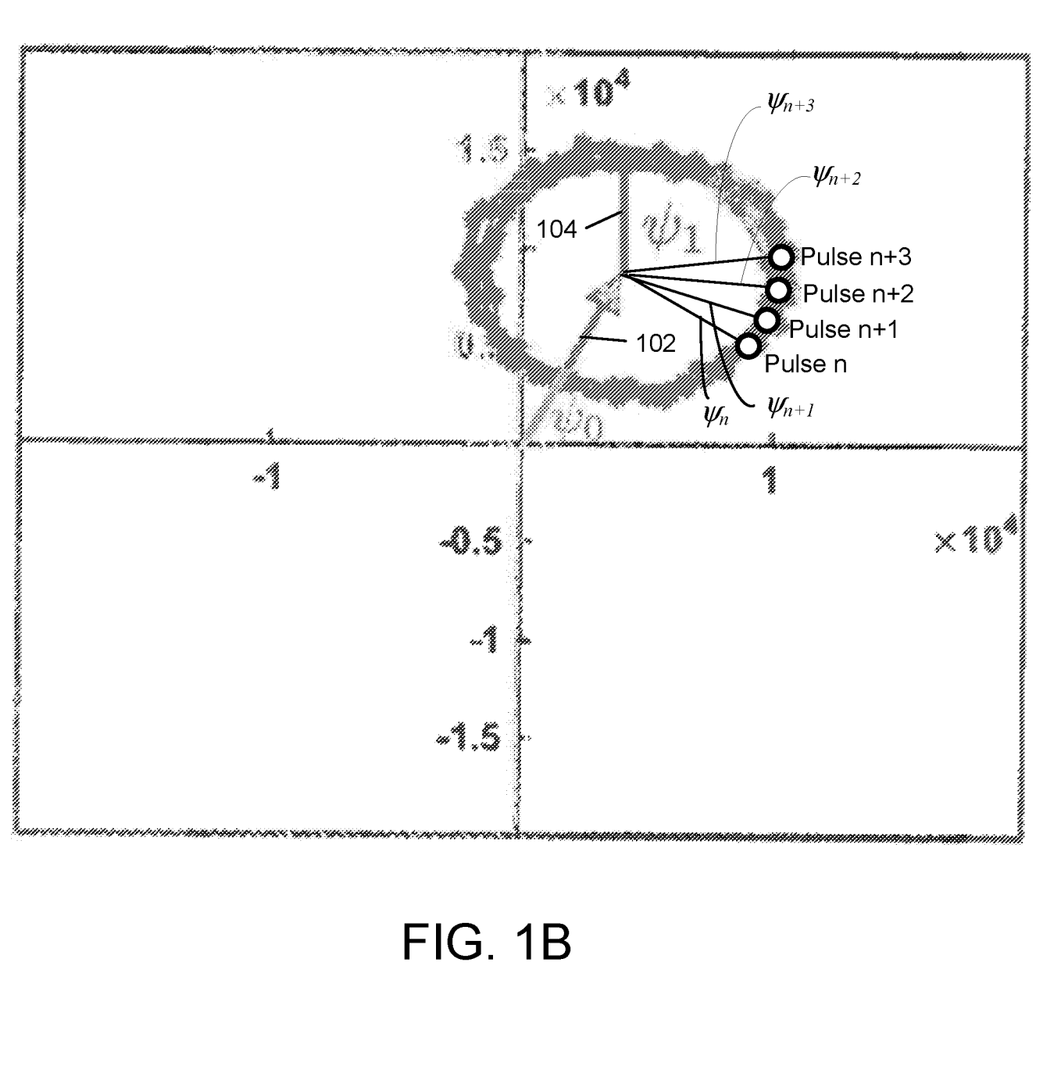

When plotted in three-dimensional (3D) space (real(V), imag(V), t), equation (1) forms a helix with the axis in the time dimension. An example of such a raw IQ voltage waveform (before phase Doppler processing as described herein according to the embodiments) is shown in FIGS. 1A and 1B. FIG. 1A shows the how the IQ data forms a helix in three-dimensional space. FIG. 1B condenses the time axis and plots the data as a circle, with the relevant parameters $\psi_0$ 102 representing the static clutter reflection and $V_1$ 104 representing the amplitude of the moving target reflection.

Equation (1) demonstrates that the angle argument of the exponential term $(2ikR - 2kv\Delta t)$ is a linear function of time, where the intercept represents the specific position of the target platform (with considerable ambiguity), and the slope relates to the velocity of the target platform. Rather than process this data with a Fourier-based method, the phase Doppler radar of the described embodiments fits the phase angle of the return signal to a linear function to extract the velocity at a much higher precision compared to the Fourier-based method, as will presented in more detail below.

Figure 2A:
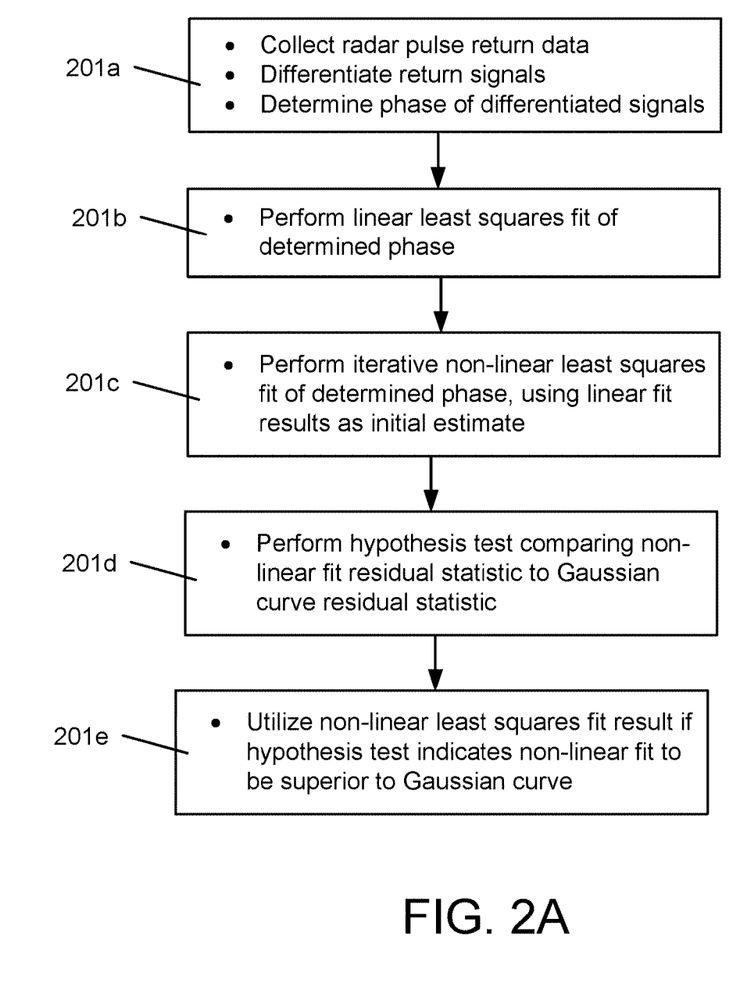
FIG. 2A shows an example summary flow diagram of a procedure to implement a phase Doppler radar system according to the invention.
Figure 2B:
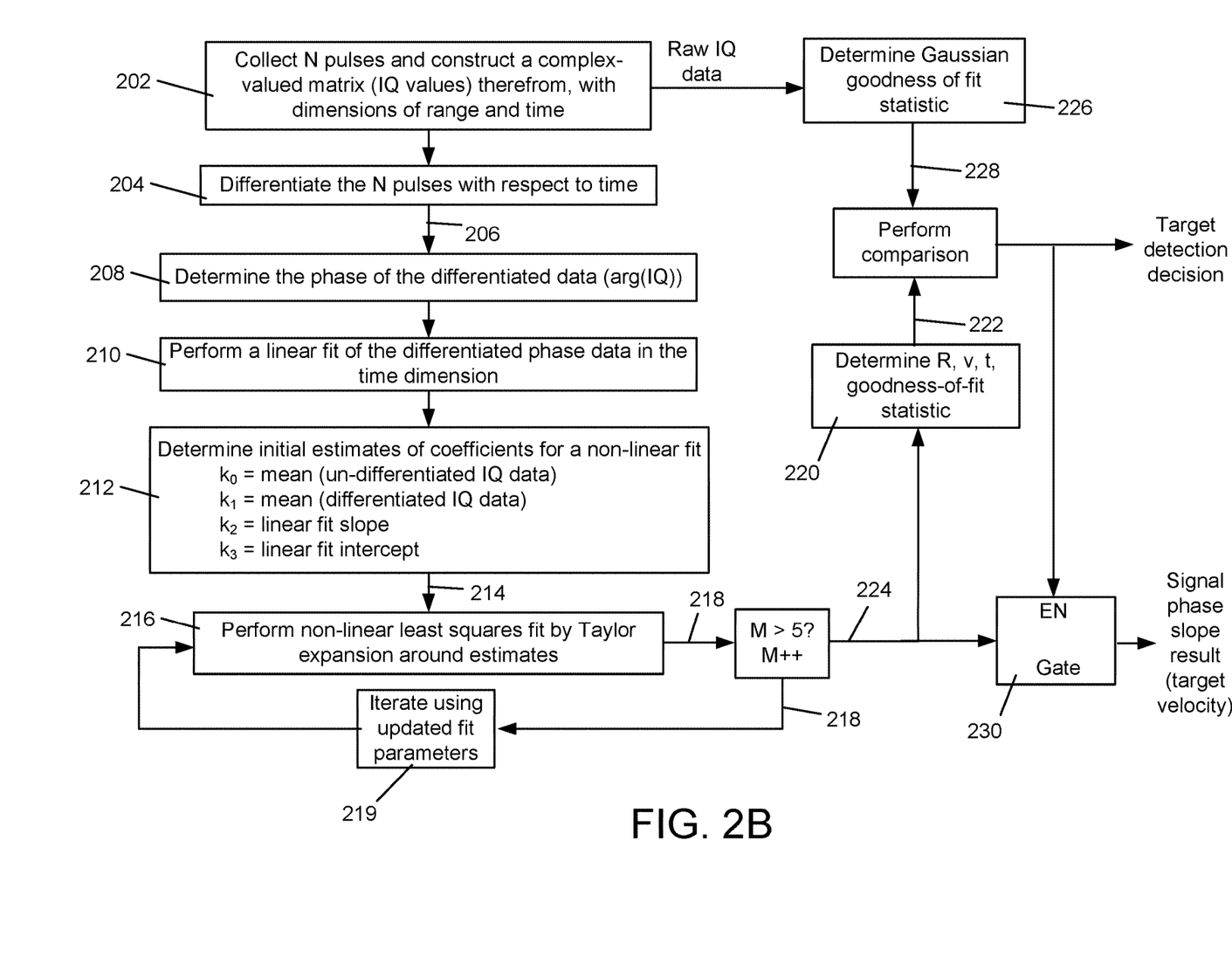
FIG. 2B illustrates a more detailed diagram that expands upon the summary diagram of FIG. 2A.

A summary flow diagram, depicting an example embodiment of the invention, is shown in FIG. 2A. FIG. 2B illustrates a more detailed diagram that expands upon the summary diagram of FIG. 2A.

As shown in FIG. 2A, a collection phase 201a comprises collection of radar pulse return data, differentiation of the return data, and determination of the phase of the differentiated signals. A linear least-squares-fit 201b of the determined phase is performed, followed by an iterative non-linear least-squares-fit 201c of the determined phase, using the linear fit results as an initial estimate. A hypothesis test 201d is performed, which compares a non-linear fit residual statistic to a Gaussian curve residual statistic, and the non-linear least-squares-fit result is utilized 201e if the hypothesis test indicates that the non-linear fit is superior to the Gaussian curve.

Referring to FIG. 2B, the example embodiment constructs 202 a matrix of N (N being an integer; N=4 in this example) received I and Q values, such that one dimension of the matrix corresponds to the range of each reflection (Range direction) and the other dimension of the matrix corresponds to the time between pulses (Pulse direction). The resulting matrix thus forms a set of range cells, arranged with respect to time.

Figure 3:
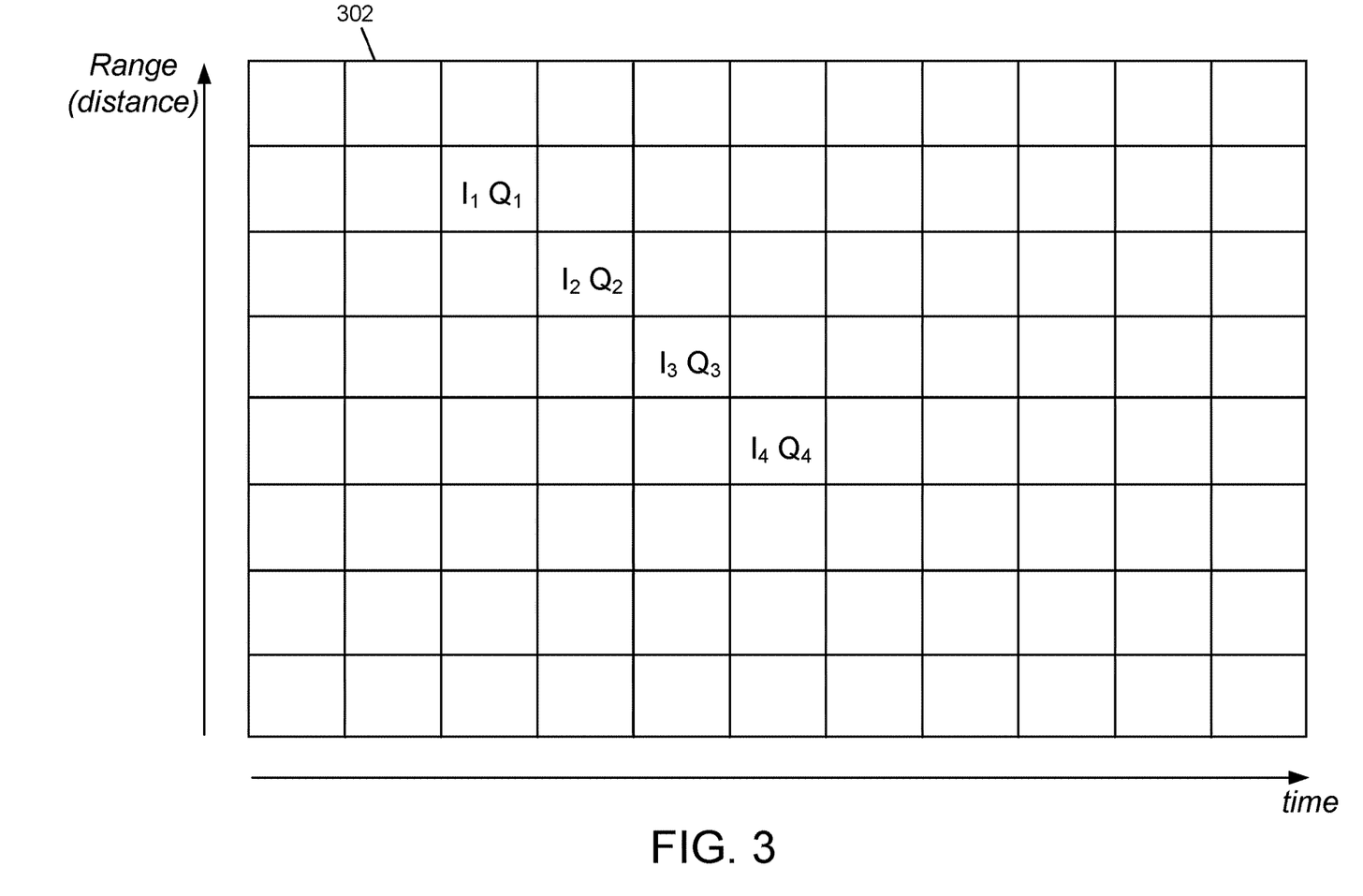
FIG. 3 illustrates an example of such a range-time matrix according to the invention.

FIG. 3 illustrates an example of such a matrix 302 according to the described embodiments. Four return pulses are shown in this example, represented by $I_1 Q_1$, $I_2 Q_2$, $I_3 Q_3$, and $I_4 Q_4$, where $I_1 Q_1$ is the baseband information from the first pulse received, and $I_4 Q_4$ is the baseband information from the last pulse received. In this example, the range of the received pulses is decreasing as time increases, indicating that the target is approaching the radar system. Range is determined by the round-trip propagation time of the radar pulse (time of flight).

In situations where there is a large amount of static clutter, the received signal may exhibit an offset associated with the clutter. The matrix 302 may be differentiated 204 with respect to time, to produce differentiated pulse data 206. This differentiation 204 operates to remove the clutter offset.

Figure 1C:
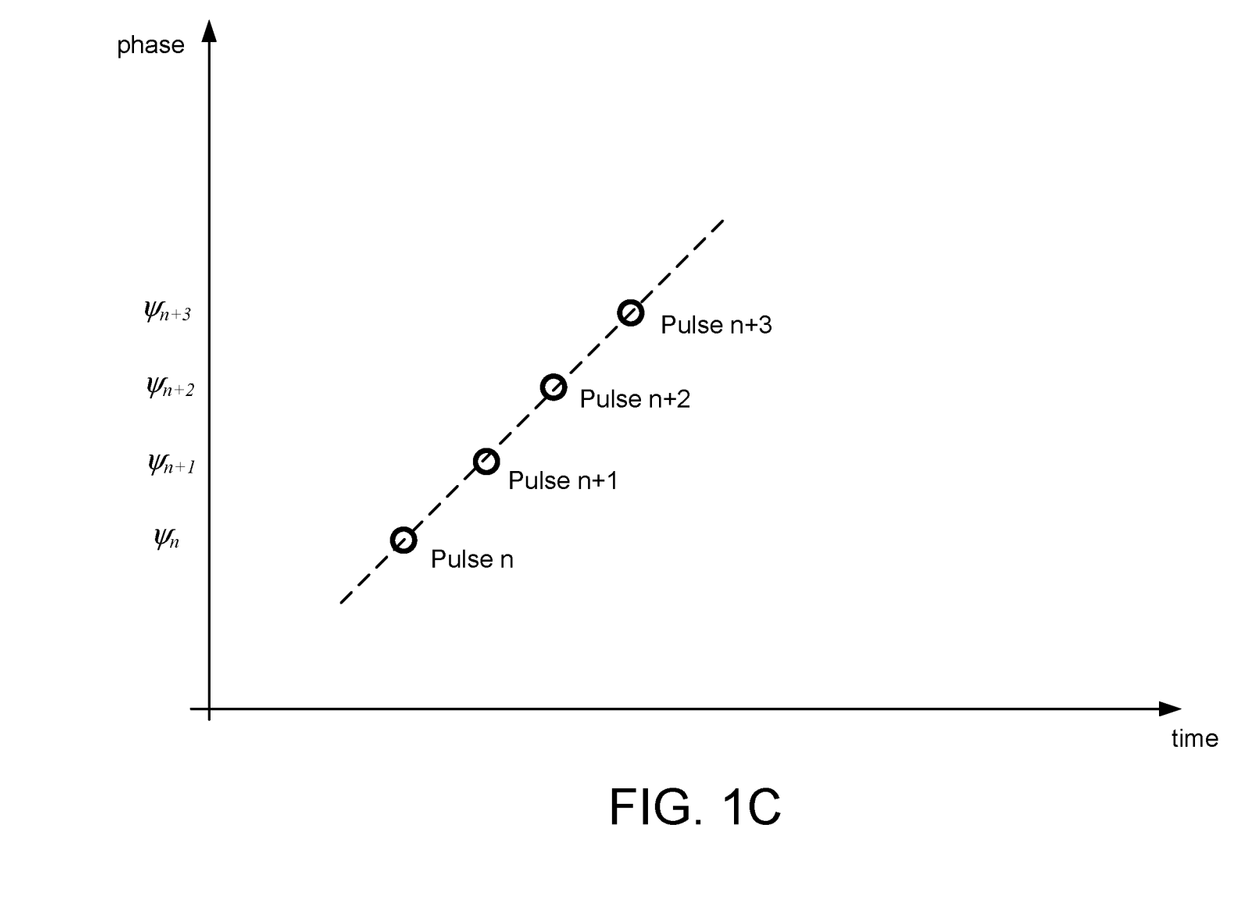
FIG. 1C shows the phases of four example target returns plotted with respect to time.

Phases of successively received Doppler signals (in the pulse direction) from a moving target with a constant velocity will lie on a line. This is because the Doppler frequency associated with the moving target may be viewed as being distributed across the successive pulses. The phase change between successive pulses is due to a change in the distance between the moving target and the radar transmitter/receiver. FIG. 1B depicts four example pulse returns, pulse n, pulse n+1, pulse n+2 and pulse n+3, distributed about the circle of target returns. Also depicted are four associated phases, $\psi_n$, $\psi_{n+1}$, $\psi_{n+2}$, and $\psi_{n+3}$. FIG. 1C shows the phases of these four target returns plotted with respect to time. As shown, the phases lie on a line.

A phase change with respect to time is frequency, so the Doppler phase change with respect to time is the Doppler frequency, which is proportional to the target velocity. For a constant target velocity, the change of the phase of the received pulses with respect to time will be constant, so the phase values of the successive pulses will lie on a line. The slope of the line (the change in phase with respect to time) represents the Doppler frequency associated with the returned pulses.

Accordingly, the example embodiment determines 208 the phase of the differentiated pulse data for each of the N received pulses. The differentiated phase may be determined, for example, by evaluating the differentiated in-phase (I) and quadrature (Q) components of the radar return baseband signal as phase=tarr$^{-1}$(I/Q). The example embodiment may then perform 210 a linear fit to the differentiated baseband phase information for each range cell. As described above, the slope of the linear fit is proportional to the target velocity, and provides an estimated state.

This estimated state, determined as described above with a linear fit, is then fed into a nonlinear least-squares fit, formed by performing a Taylor expansion of a complex exponential in time. The fit parameters are a base magnitude, a signal magnitude, and a coefficient for the exponential. The fit parameters are represented by $k_0$, $k_1$, $k_2$ and $k_3$ in the following equation:

$$IQ = k_0 + k_1 \exp(ik_2 t + k_3) \quad (2)$$

Equation (2) is of the form described herein with respect to equation (1). A non-linear least squares fit is used because the prediction equation (2) depends non-linearly on unknown parameters. Through the use of a Taylor series expansion, the non-linear prediction equation (2) is linearized locally about the estimated state. The locally linearized equation through a linear fit, and the solution used for subsequent iterations of the non-linear equation.

As described above, the parameters of equation (2) correspond to those of equation (1). The parameter $k_0$ is related to the magnitude of the static clutter associated with the target, $k_1$ is related to the target radar cross section, $k_2$ is related to the target velocity, and $k_3$ is an arbitrary phase offset. For the initial estimates, $k_0$ is determined 212 as the mean of the undifferentiated IQ data, $k_1$ is determined 212 as the mean of the differentiated IQ data, $k_2$ is determined 212 as the linear fit slope, and $k_3$ is determined 212 as the linear fit intercept. The initial fit parameters 214 are provided to the non-linear least squares fit processing. Performing 216 the non-linear least squares fit, as shown in the example embodiment, produces an updated version 218 of the fit parameters $k_0$, $k_1$, $k_2$ and $k_3$.

The updated fit parameters $k_0$, $k_1$, $k_2$ and $k_3$, resulting from the nonlinear least squares fit, may then be fed back 219 into the non-linear least squares fit processing for a subsequent iteration to improve the estimation. This non-linear least squares fitting operation may be repeated several times to further improve the estimation. Experimentation has demonstrated five iterations, as shown in the example embodiment, to typically be sufficient, although other iteration values may alternatively be used.

The fitting described above may produce poor results due to various reasons, such as a weak or corrupted radar return signal, as well as inconsistencies that are inherent in non-linear least squares fitting. Poor fitting results may degrade the overall performance of the radar system. Such poor results may be discarded to improve confidence in the associated target detection.

One way to mitigate a performance degradation due to poor fitting results is to compare a statistical parameter related to the fitting results to a corresponding parameter related to a reference standard. Accordingly, a "goodness of fit" (GoF) statistic may be determined and evaluated to improve a target detection decision through a hypotheses test. In general, the hypothesis test determines if the fit resulting from the linear and non-linear fitting is a better characterization of the data than just Gaussian noise. Fit residuals are provided by determining the difference between the fit and the actual data. Gaussian residuals are provided by determining the difference between the mean of the samples and the samples themselves. If the fit residuals are smaller than the Gaussian residuals by a certain amount, the fit is determined to be good enough to be declared a detection event.

The example embodiment determines 220 a GoF statistic 222 based on the final results 224 of the nonlinear fit, which comprises final iteration of the slope of the fitted line upon which the signal phases lie. The final results 224 also comprise the residuals of the non-linear least squares fit. The GoF statistic determination 220 in FIG. 2 refers to range-velocity-time (R, v, t), to distinguish between the manipulation of raw data before thresholding, and the presence of detected targets after thresholding. The example embodiment also determines 226 a GoF statistic 228 based on Gaussian noise over the same period of time. In the example embodiment, the GoF statistic 222 for the non-linear fit is the squared sum of the residuals for the non-linear fit, and the GoF statistic 228 for the Gaussian noise is the residuals of a Gaussian curve that is estimated by the mean and standard deviation of the raw I and Q data.

The example embodiment compares GoF statistic for the non-linear fit to the GoF statistic for the Gaussian noise. If the comparison indicates that the nonlinear fit GoF statistic is superior to (i.e., greater than) the Gaussian noise GoF statistic by a specified threshold value, a target detection is declared. The specified threshold may be predetermined based on various factors, for example environmental conditions, and the particular radar system components being used to implement the radar pulse transmission and reception, among others. In general, the threshold should be set high enough to keep the number of false detections below a desired amount when no pulse returns are present (e.g., when system is detecting only background noise). A gate 230 selectively passes the final results 224 of the non-linear fit based on the target detection decision, i.e., when the nonlinear fit GoF statistic is superior to (i.e., greater than) the Gaussian noise GoF statistic by the threshold value.

Figure 4:
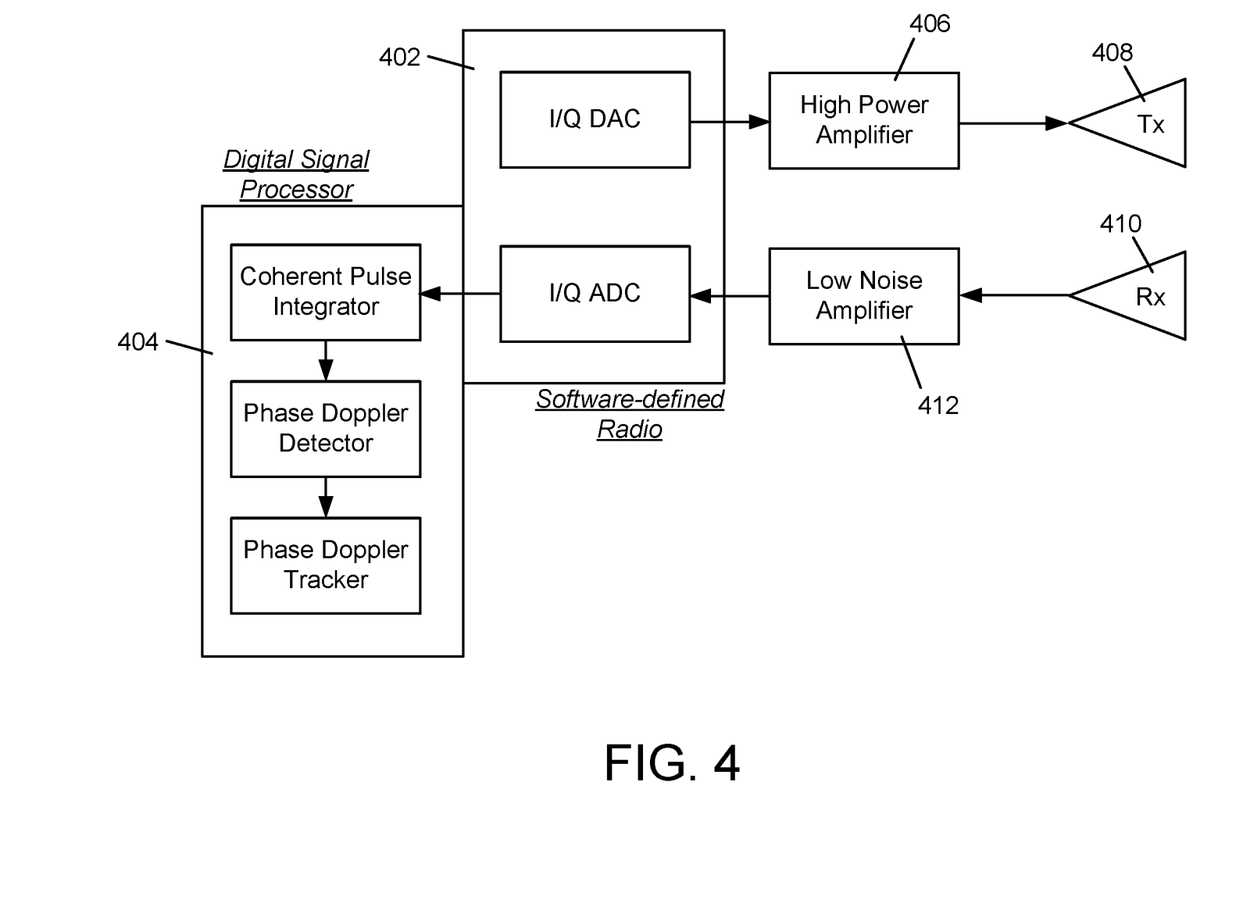
FIG. 4 illustrates a block diagram of an example implementation of the invention.

A block diagram of an example implementation of the described embodiments is shown in FIG. 4. It should be noted that the sidecar instantiation consists of the software defined radio 402 and the digital signal processor 404. The software defined radio (SDR) 402 (in this example, an Ettus Research X310 with UBX daughterboards) is used to generate the waveform. The main waveforms used are 5.8 GHz square pulses, each with a pulse width of 40 ns, and a 13 point barker code with a pulse width of 520 ns (40 ns per chip). The pulse repetition frequency for this example is 2 kHz. In each case a 16-pulse train is used to increase signal to noise ratio. This pulse is sent to an amplification chain 406 consisting of two mini-circuits amplifiers (in this example a ZX60-V62+ and a ZX60-V63+) and ending in a dish antenna 408 (in this example, an LCOM HG5822EG).

A receive antenna 410 (also an LCOM HG5822EG) is followed by an RF limiter and a low noise amplifier 412 (a mini circuits ZX60-83LN+). The incoming signal is digitized in a manner that is coherent with the transmit pulse using the software defined radio 402. This pulse is then sent to a digital signal processor 404, in this example a custom Alienware computer. The digital signal processor integrates the pulses over the pulse train and initiates the process described herein with respect to FIG. 2. The parameters of the example embodiment of FIG. 4 are listed in Table 1.

TABLE 1

| Frequency | 5.8 GHz |
| Peak Transmit Power | 20 mW |
| Pulse Width | 40 nS |
| Range Resolution | 6 m |
| Fast Time PM (pulse train) | 1.2 μS |
| Slow Time PM (repetition rate) | 500 μS |

The RF front end of the example embodiment shown in FIG. 4 is operated just like a pulse Doppler radar—a short pulse is broadcast, and the reflected return signals are analyzed. After return signals from several pulses are collected, they are condensed by a detector into plots, which are a correlated measurement of range, velocity and time (R, v, t). Range is determined by the propagation time (time of flight). Velocity in this case is determined by the Interpulse Doppler superresolution technique described herein with respect to FIG. 2. Pulse Doppler radars determine velocity using a technique involving a Fourier transform. The Doppler superresolution radar, by contrast, produces a fit to the function given by equation (1):

$$V = \psi_0 + \psi_1 \exp(i(C_0 + C_1 k \Delta t)),$$

where $\psi_0$ represents the return from background clutter—a radar according to the described embodiments is configured to operate in confined environments. $\psi_1$ represents the reflection characteristics of the moving target. $C_0$ is a term related t the initial position of the target, and $C_1$ is related to the velocity of the target.

These terms may be estimated with the following equations:

$$\theta_1 = \tan^{-1}\left[\frac{\mathrm{imag}(V)}{\mathrm{real}(V)}\right]$$

$$\psi_1 = \mathrm{mean}(|V'|)/C_1$$

$$\psi_0 = \mathrm{mean}(v - \psi_1 \exp(i(C_0 + C_1 \Delta t)))/C_1$$

$C_0$ and $C_1$ are produced from a linear fit of $\theta_1$ with respect to time. This phase angle, measured by the SDR device 402, wraps around so that it is always between $[-\pi, \pi]$, and so to simplify the linear fit, the angle first needs to be unwrapped. This means that the actual value used for $\theta_1$ is the cumulative sum of the phase change wrapped to the interval $[-\pi, \pi]$. Velocity is then calculated by the equation $v = C_1 \lambda/\pi$. Detections are generated by a hypothesis test comparing a GoF statistic between the complex exponential fit (also referred to herein as the non-linear least squares fit) and a constant background assumption, i.e., comparing the residual of the measured voltage signal and the median with the residual of the measured voltage signal and the predicted voltage signal based on equation (2).

The technique described above provides more accurate results than typical Fourier-based methods for Doppler analysis, as it is not subject to aliasing. The technique leverages the assumption that there are not phenomena at multiple frequencies, and that there is only one frequency in the system. This technique also circumvents the limited Fourier resolution—there is no interference between frequencies that are closer than $2/\Delta t$, due to the assumption that there exists only one frequency in the system. Fourier methods assume all signals can be represented by a series of sinusoids, and that a finite truncation of this series is a generally sufficient representation. A sinusoid that has a frequency between two of the basis sinusoids is represented by a summation of nearby sinusoids. This leads to aliasing phenomenon and a loss of precision. This reduced precision in a Fourier-based system can be recovered to some degree by fitting the function in frequency space, but doing so does not dramatically improve the resolution when a small number of points (i.e., radar returns) are used.

Figure 5A:
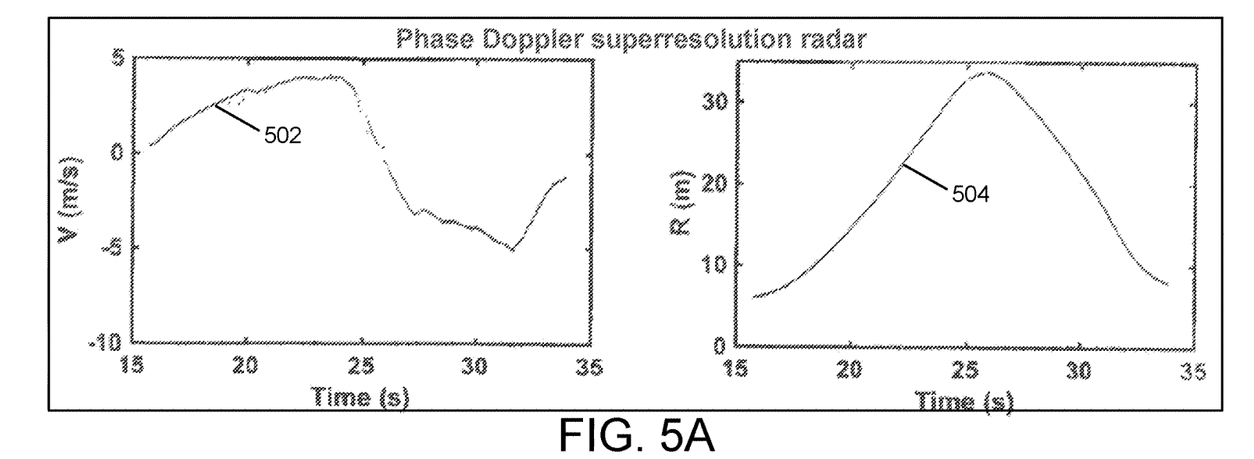
FIGS. 5A and 5B show detection results of an example embodiment as compared to a conventional pulse Doppler radar system.
Figure 5B:
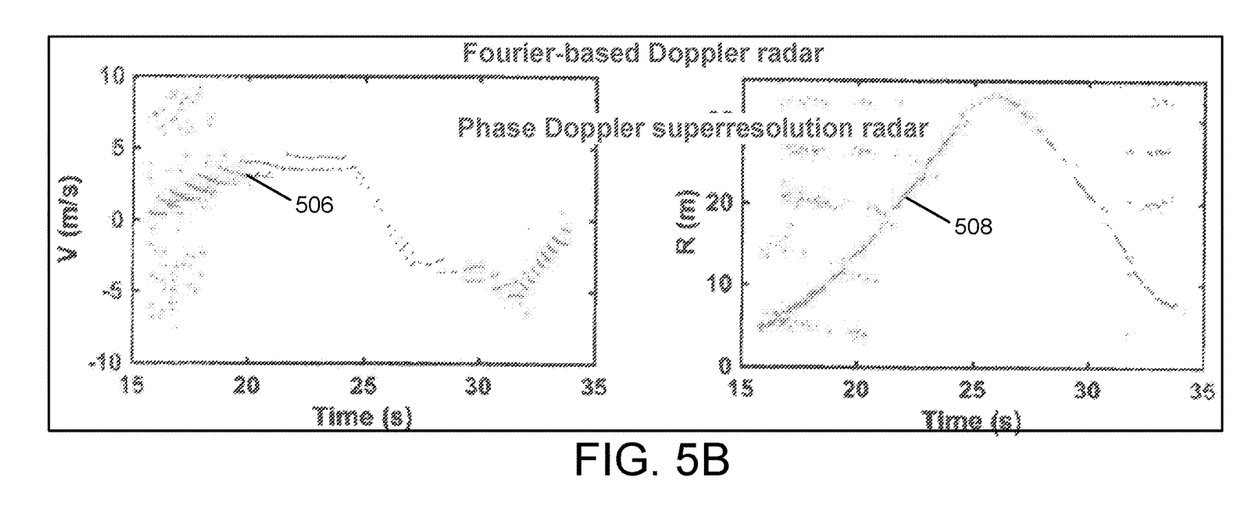

FIGS. 5A and 5B compare detection results over the course of an experiment with a fixed integration window of 100 pulses. These figures demonstrate the improvements gained from the phase Doppler radar techniques of the described embodiments. FIG. 5A presents a plot of r, v, t data generated with the phase Doppler techniques described herein (velocity 502 and range 504), and FIG. 5B presents a plot of r, v, t data generated with a Fourier based range Doppler map peak fitting technique (velocity 506 and range 508). Both techniques use 100 data points for Doppler estimation. The phase Doppler technique, shown in FIG. 5A, produces fewer noise plots and much more precise estimates of velocity, which are used in the range reconstruction.

Figure 6:
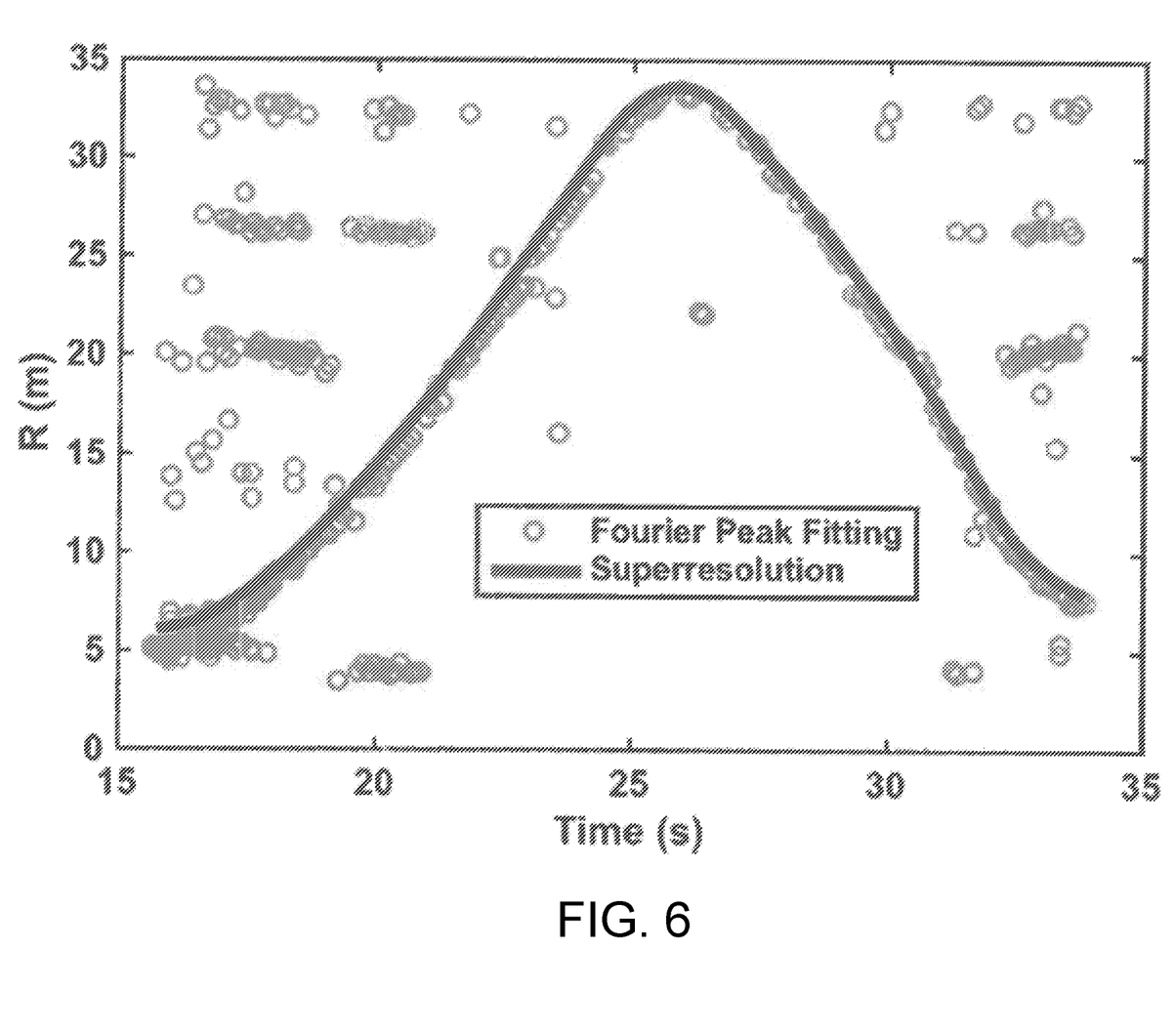
FIG. 6 demonstrates range detection improvements of an example embodiment as compared to a conventional pulse Doppler radar system.

The improved velocity precision can be exploited to reconstruct range more accurately than the range cells of the associated radar system. Range may be reconstructed by finding the best fit between the range cell data and the numerical integral of the velocity trace. A detailed view of the range precision improvement is shown in FIG. 6. It is important to note that these results do not use any smoothing or filtering techniques, nor do they include tracking or association.

A key advantage of the described embodiments is the high velocity precision without requiring long pulse lengths or multi-second processing. This enables many advantages over conventional radars, for example (i) high precision range measurements through velocity integration, (ii) improved tracking by matching velocity, (iii) improved detection of slow moving objects among static clutter, and (iv) precise velocity correction for recognition techniques.

Figure 7:
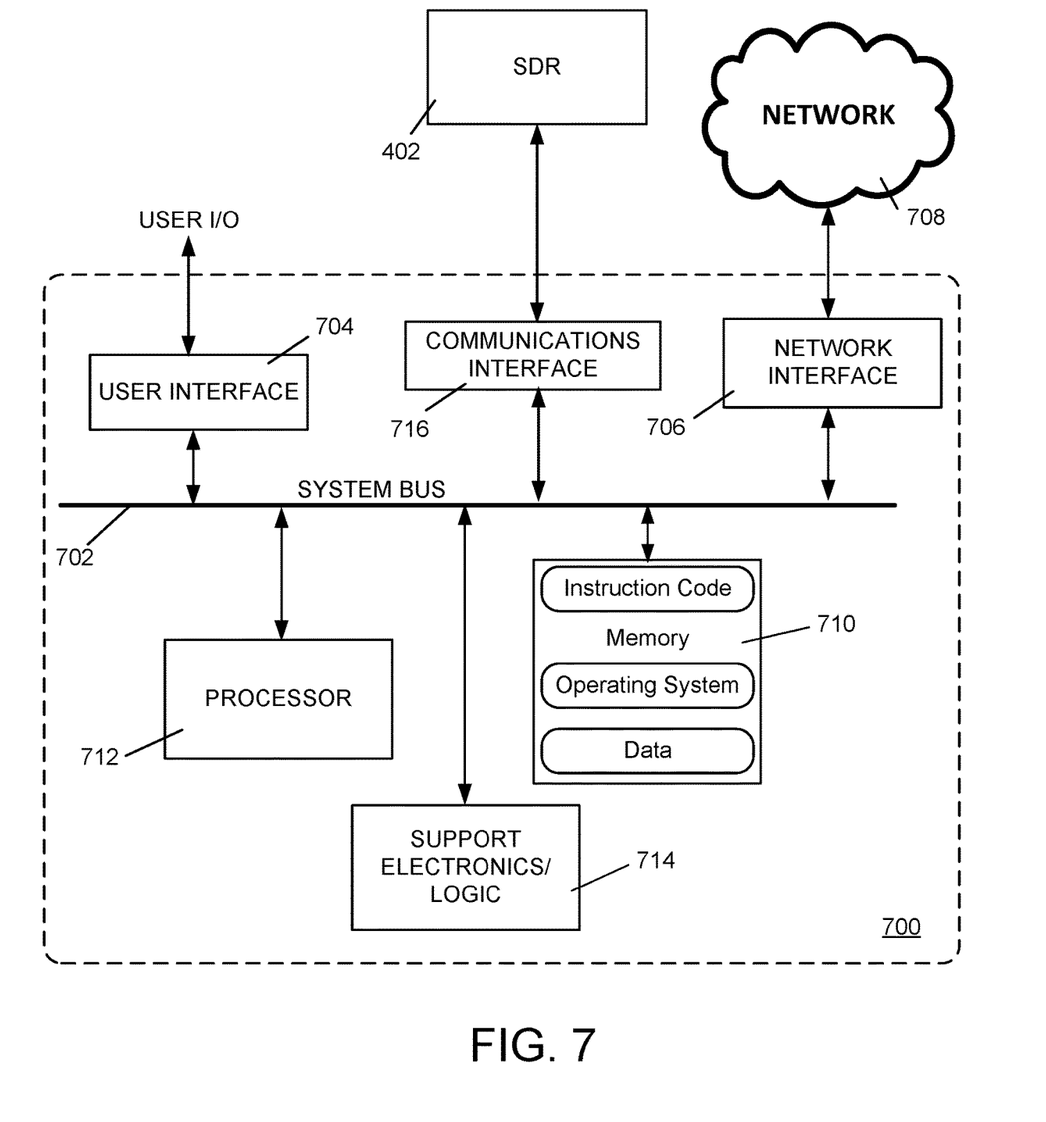
FIG. 7 is a diagram of an example internal structure of a processing system that may be used to implement one or more of the embodiments described herein.

FIG. 7 is a diagram of an example internal structure of a processing system 700 that may be used to implement one or more of the embodiments described herein. The processing system 700 may, for example, implement the digital signal processor 404 depicted in FIG. 4. Each processing system 700 contains a system bus 702, where a bus is a set of hardware lines used for data transfer among the components of a computer or processing system. The system bus 702 is essentially a shared conduit that connects different components of a processing system (e.g., processor, disk storage, memory, input/output ports, network ports, etc.) that enables the transfer of information between the components.

Attached to the system bus 702 is a user I/O device interface 704 for connecting various input and output devices (e.g., keyboard, mouse, displays, printers, speakers, etc.) to the processing system 700. A network interface 706 allows the computer to connect to various other devices attached to a network 708. Memory 710 provides volatile and non-volatile storage for information such as computer software instructions used to implement one or more of the embodiments of the present invention described herein, for data generated internally and for data received from sources external to the processing system 700.

A central processor unit 712 is also attached to the system bus 702 and provides for the execution of computer instructions stored in memory 710. The system may also include support electronics/logic 714, and a communications interface 716. The communications interface may comprise the interface to the software-defined radio (SDR) 402 described with reference to FIG. 4.

In one embodiment, the information stored in memory 710 may comprise a computer program product, such that the memory 710 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A phase Doppler radar system, comprising:
    a pulse Doppler receiver and transmitter (R/T) subsystem;
    a processor; and
    a memory with computer code instructions stored thereon, the memory operatively coupled to the processor such that, when executed by the processor, the computer code instructions cause the system to:
        collect N consecutive pulses, each comprising a complex value, generated by the pulse Doppler R/T subsystem in response to reflections received from a target, the N consecutive pulses received by a same antenna element, N being a positive integer;

determine a phase of each of the N pulses;

differentiate the N pulses with respect to time to produce a set of N time-differentiated pulses;

determine a differentiated phase of each of the N time-differentiated pulses; and perform a linear fit of the differentiated phases of the differentiated N pulses to produce a slope and an intercept.

2. The system of claim 1, wherein the computer code instructions further cause the system to:

determine a set of initial estimates of coefficients of a non-linear fit equation, the coefficients being (a) a mean of the phase determinations, (b) a mean of the differentiated phase determinations, (c) the slope, and (d) the intercept; and perform M iterations of a non-linear least squares fit, M being a positive integer, beginning with the determined set of initial estimates of coefficients, to produce a non-linear fit result.

3. The system of claim 2, wherein the computer code instructions further cause the system to:

determine a first goodness-of-fit (GoF) residual parameter with respect to non-linear least squares fit, and a second GoF residual parameter with respect to the N consecutive pulses received from the pulse Doppler R/T subsystem; and determine that the non-linear fit result is a detection event when the first GoF residual parameter is less than the second GoF residual parameter.

4. The system of claim 3, wherein the second GoF residual parameter is based on residuals of a Gaussian distribution associated with a mean and a standard deviation that corresponds to the N consecutive pulses received from the pulse Doppler R/T subsystem.

5. The system of claim 4, wherein the residuals of the Gaussian distribution are generated by determining a difference between the mean corresponding to a measured baseband voltage of the N consecutive pulses received from the pulse Doppler R/T subsystem and the measured baseband voltage of each of the N consecutive pulses.

6. The system of claim 2, wherein the non-linear fit equation is given by $IQ=k_0+k_1 \exp(ik_2 t+k_3)$, where IQ represents a measured baseband voltage of the N consecutive pulses received from the pulse Doppler R/T subsystem, and $k_0$, $k_1$, $k_2$ and $k_3$ are the coefficients of the non-linear fit equation.

7. The system of claim 6, wherein $k_0$ represents a magnitude of static clutter associated with the target, $k_1$ represents a radar cross section of the target, $k_2$ characterizes a velocity of the target, and $k_3$ represents an arbitrary phase offset.

8. The system of claim 2, wherein the non-linear least squares fit is performed by a Taylor expansion around the initial estimates of the coefficients.

9. The system of claim 2, wherein each iteration of the non-linear least squares fit produces an updated version of the coefficients, which are used for a subsequent iteration of the non-linear least squares fit.

10. The system of claim 2, wherein the number M of non-linear least squares fit iterations is five.

11. The system of claim 1, wherein a linear fit of the phase of the differentiated N pulses is performed to determine an initial estimate of the slope and the intercept.

12. A method of determining a velocity of a target object, comprising:

collecting N consecutive pulses, each comprising a complex value, generated by a pulse Doppler receiver and transmitter (R/T) subsystem in response to reflections received from a target, the N consecutive pulses received by a same antenna element, N being a positive integer;

determining a phase of each of the N pulses;

differentiating the N pulses with respect to time to produce a set of N time-differentiated pulses;

determining a differentiated phase of each of the N time-differentiated pulses; and performing a linear fit of the differentiated phases of the differentiated N pulses to produce a slope and an intercept.

13. The method of claim 12, further comprising:

determining a set of initial estimates of coefficients of a non-linear fit equation, the coefficients being (a) mean of the phase determinations, (b) mean of the differentiated phase determinations, (c) the slope, and (d) the intercept; and performing M iterations of a non-linear least squares fit, M being a positive integer, beginning with the determined set of initial estimates of coefficients, to produce a non-linear fit result.

14. The method of claim 13, further comprising:

determining a first goodness-of-fit (GoF) residual parameter with respect to non-linear least squares fit, and a second GoF residual parameter with respect to the N consecutive pulses received from the pulse Doppler R/T subsystem; and determining that the non-linear fit result is a detection event when the first GoF residual parameter is less than the second GoF residual parameter.

15. The method of claim 14, further basing the second GoF residual parameter on residuals of a Gaussian distribution associated with a mean and a standard deviation that corresponds to the N consecutive pulses received from the pulse Doppler R/T subsystem.

16. The method of claim 15, further generating the residuals of the Gaussian distribution by determining a difference between the mean corresponding to a measured baseband voltage of the N consecutive pulses received from the pulse Doppler R/T subsystem and the measured baseband voltage of each of the N consecutive pulses.

17. The method of claim 13, further providing the non-linear fit equation as $IQ=k_0+k_1 \exp(ik_2 t+k_3)$, where IQ represents a measured baseband voltage of the N consecutive pulses received from the pulse Doppler R/T subsystem, and $k_0$, $k_1$, $k_2$ and $k_3$ are the coefficients of the non-linear fit equation.

18. The method of claim 17, wherein $k_0$ represents a magnitude of static clutter associated with the target, $k_1$ represents a radar cross section of the target, $k_2$ characterizes a velocity of the target, and $k_3$ represents an arbitrary phase offset.

19. The method of claim 13, further performing the non-linear least squares fit by a Taylor expansion around the initial estimates of the coefficients.

20. A non-transitory computer-readable medium with computer code instruction stored thereon, the computer code instructions, when executed by a processor, cause an apparatus to:

collect N consecutive pulses, each comprising a complex value, generated by a pulse Doppler R/T subsystem in response to reflections received from a target, the N consecutive pulses received by a same antenna element, N being a positive integer;

determine a phase of each of the N pulses;

differentiate the N pulses with respect to time to produce a set of N time-differentiated pulses;

determine a differentiated phase of each of the differentiated N pulses; and perform a linear fit of the differentiated phases of the N time-differentiated pulses to produce a slope and an intercept.

21. The non-transitory computer-readable medium of claim 20, wherein the computer code instructions, when executed by a processor, further cause an apparatus to:

determine a set of initial estimates of coefficients of a non-linear fit equation, the coefficients being (a) mean of the phase determinations, (b) mean of the differentiated phase determinations, (c) the slope, and (d) the intercept; and perform M iterations of a non-linear least squares fit, M being a positive integer, beginning with the determined set of initial estimates of coefficients, to produce a non-linear fit result.

22. The non-transitory computer-readable medium of claim 21, wherein the computer code instructions, when executed by a processor, further cause the apparatus to:

determine a first goodness-of-fit (GoF) residual parameter with respect to non-linear least squares fit, and a second GoF residual parameter with respect to the N consecutive pulses received from the pulse Doppler R/T subsystem; and determine that the non-linear fit result is a detection event when the first GoF residual parameter is less than the second GoF residual parameter.

23. The non-transitory computer-readable medium of claim 21, wherein the computer code instructions, when executed by a processor, further cause the apparatus to perform the non-linear least squares fit by a Taylor expansion around the initial estimates of the coefficients.

* * * * *